United States Patent [19]

Spohr

[11] 4,276,903
[45] Jul. 7, 1981

[54] CONTROL VALVE

[76] Inventor: Hanswerner Spohr, Leibreddestr. 1, Witten 7 - Stockum, Fed. Rep. of Germany, 5810

[21] Appl. No.: 906,676

[22] Filed: May 16, 1978

[30] Foreign Application Priority Data

May 24, 1977 [DE] Fed. Rep. of Germany ....... 2723309

[51] Int. Cl.³ .................. F16K 37/00; H01H 9/06
[52] U.S. Cl. .................... 137/554; 137/555; 200/61.86
[58] Field of Search .................. 137/554, 552, 555; 222/23, 41; 200/61.25, 61.26, 61.86

[56] References Cited

U.S. PATENT DOCUMENTS

| 389,097 | 9/1888 | Newmon | 200/61.86 |
|---|---|---|---|
| 1,911,641 | 5/1933 | Morris | 200/61.25 |
| 2,146,479 | 2/1939 | Horstmann | 137/554 |
| 2,206,163 | 7/1940 | Clench | 200/61.86 |
| 2,818,476 | 12/1957 | Mueller et al. | 200/61.86 |
| 2,876,306 | 3/1959 | Skinner et al. | 200/61.25 |
| 3,390,943 | 7/1968 | Myers | 137/554 |
| 3,487,435 | 12/1969 | Sheardown | 200/61.86 |
| 3,741,244 | 6/1973 | Ise | 137/554 |
| 3,742,970 | 7/1973 | Gross | 137/554 |
| 3,890,995 | 6/1975 | Miller et al. | 137/554 |
| 3,993,247 | 11/1976 | Tyler | 137/554 |
| 4,043,351 | 8/1977 | Durling | 137/554 |

Primary Examiner—Martin P. Schwadron
Assistant Examiner—P. Michael Chambers
Attorney, Agent, or Firm—W. G. Fasse; D. F. Gould

[57] ABSTRACT

A valve for controlling fluidic media is constructed with a movable operating element which acts simultaneously as a switching element of an electrical switch. The surfaces of the valve casing or the valve sleeve or the movable operating or switching element are mutually insulated and interrupted at specific positions of the switching element by contacts perpendicular to the direction of movement of the switching element which bridges the contacts. At least one contact may be formed by the valve seat to indicate maximum closure and one contact is located on the valve cover to indicate full opening of the valve.

3 Claims, 2 Drawing Figures

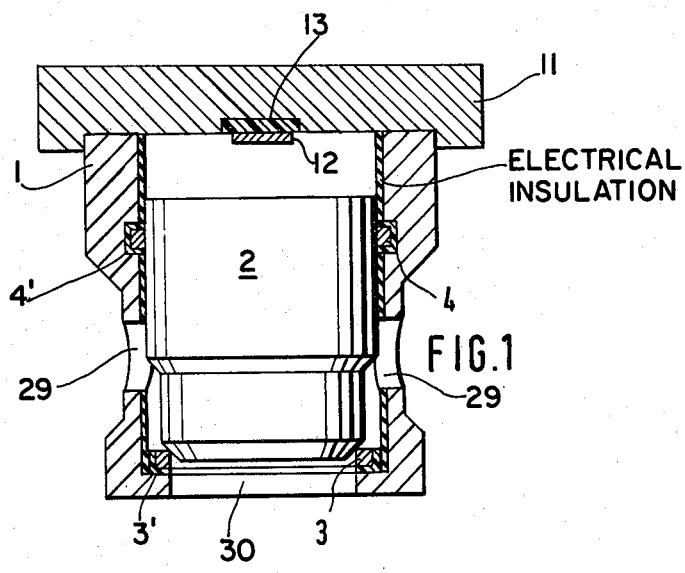
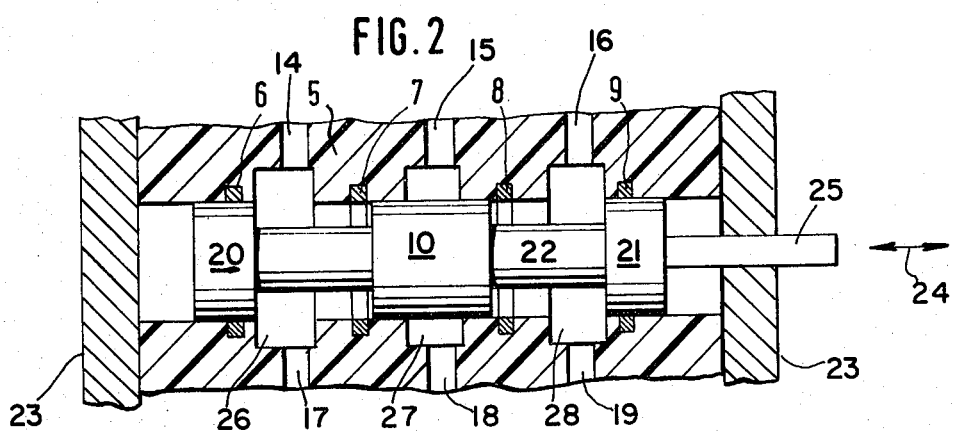

CONTROL VALVE

BACKGROUND OF THE INVENTION

The invention relates to a valve for controlling fluidic media with a movable operating element which selectively closes, partially or totally opens at least one passage cross-section.

Many valves are known which are constructed, for example, as passage valves, pressure valves, check valves, resuction valves, charging and resuction valves and charging valves, which have associated therewith mechanical, inductive or capacitive switches for monitoring the position of a movable operating element which determines at least one passage cross-section. Apart from the high technical expenditure which arises because of the special association of a switch, the known valves have the common disadvantage that monitoring the position of the movable operating element cannot be effected exactly because of inaccuracies inherent in the production. The inaccuracies inherent in the production are increased still further by assembly inaccuracies which, upon the association of the switches with the valve, cannot be held within the limits required by an absolutely exact position control.

Mechanical coupling members of electrical switches, thus cause the occurrence of inaccuracies in the signal emission, inaccuracies which, depending on the purpose of the valves checked in this way, lead not only to operating troubles, but also to considerable dangers for the operating personnel, for example, in connection with hydraulic presses, punches, shears and the like.

OBJECT OF THE INVENTION

It is the object of the invention to provide a valve for the control of fluidic media, wherein the operating element of said valve is amenable to an exact position check without mechanical coupling members between the valve and a switch associated with the valve wherein the absence of such coupling members prevents inaccuracies from occurring in the position check.

SUMMARY OF THE INVENTION

To achieve this objective the present invention proposes a valve as described in the introduction, of which the movable operating element simultaneously forms the switching element of an electrical switch, whereby either a valve sleeve which houses the switching element or a valve casing which houses switching element or the switching element itself is made of at least partially electrically non-conducting material.

The valve of this invention eliminates the mechanical coupling members by making the movable operating element to act simultaneously as switching element of an electrical switch, so that the indicated position of the movable switching element through electrical or electronic means is absolutely identical to the actual position taken up at any given time by the operating element.

A further embodiment of the invention provides that the valve sleeve has on its inner and/or outer surfaces, and/or the valve casing has at least on its inner surfaces and/or the switching element has on its outer surfaces an insulation coating which provides sealing functions and which coating is interrupted, at specific locations, by contacts.

The insulation coating in accordance with the invention makes it possible in a simple manner, to electrically isolate the individual valve parts selectively from one another in such a way that unintentional contacts do not lead to inaccurate or incorrect signallings. In this respect, it is a question of the material to construct the insulation coating in such a way that it simultaneously performs sealing functions between the moving operating element and the remaining valve parts. It is understood that the contacts interrupting the insulation coating are so positioned that the sealing functions of the otherwise continuous insulation coating are not thereby impaired.

In accordance with a further embodiment of the invention, the contacts are arranged on the valve sleeve or on the valve casing perpendicularly to the direction of movement of the switching element in such a way that these are bridgeable by the switching element as a function of the position of the switching element.

The arrangement of the contacts according to this invention, allows a plurality of position checks, since practically as many switching members as may be desired, are bridgeable by this arrangement in the most varied positions of the movable switching element.

For controlling the absolute closure position of the movable switching element, a further embodiment of the invention provides that at least one contact is arranged on the valve sealing or seating surface respectively, or seating edge, or the contact is formed by these members.

The positioning according to the invention, of at least one contact on the valve sealing or seating surface respectively or on the seating edge ensures the checking of the absolute shut-off position of the movable switching or operating element. Thus, upon the production of an electrical signal due to a corresponding contact closure, it is ensured that the movable operating or switching element has brought about the total shut-off of the passage cross-section of the valve.

A particularly advantageous embodiment of the invention provides that the valve seat forming the sealing or seating surface or edge comprises at least two parts, between which a gap is provided which is varible down to zero/o by the movement of the switching or operating member.

The structure according to the invention is of particular advantage for seat valves, since thus the split valve seat may be forced apart, for example, by springs or similar elements arranged between the parts. Thus, in the forcedapart state an electrical contact making by the contacting of a movable switching element constructed as a valve cone, is initially still prevented and the valve cone with the axially movable seat part still has to move through a residual path until the movable seat part rests on the stationary seat part of the valve seat, so that only in this position an electrical contact is made.

Finally, a further embodiment of the invention also provides that a valve cover which limits a maximum opening position of the switching element, has a contact which makes contact with a corresponding contact on the switching element only in the absolute opening position of the switching element. This embodiment likewise makes certain, corresponding to the position control of the switching element in the absolute closure position, that a control of the switching element in the absolute opening position of the valve is assured. Thus, positions deviating therefrom cannot lead to the production of an incorrect signal.

BRIEF FIGURE DESCRIPTION

In order that the invention may be clearly understood, it will now be described, by way of example, with reference to the accompanying drawings, wherein:
FIG. 1: a seat valve; and
FIG. 2: a sliding type valve.

DETAILED DESCRIPTION OF PREFERRED EXAMPLE EMBODIMENTS

The valve shown in FIG. 1 comprises a sleeve 1 which may be made of electrically conductive material. In this case, contacts 3 and 4 provided on the sleeve 1 are insulated against the electrically conductive material of the sleeve 1 by means of electrically insulating inserts 3' and 4'. The contact 3 is at the same time constructed as a valve seat, so that, upon the occurrence of a gap between the valve seat and a movable operating element 2, likewise made of electrically conductive material, a connection of the contacts 3 and 4 cannot take place. Hence, no electrical signal may be produced. Only when the operating element or switching element 2 touches the valve seat constructed as a contact 3, are these contacts 3 and 4 closed via the conductive switching element 2, so that a signal indicating the closing position of the switching element 2 may be produced.

The valve shown in FIG. 2 is a sliding type valve having a valve casing 5 made of an electrically non-conductive material and provided with electrical contacts 6, 7, 8 and 9. It is to be understood that the valve casing 5 may likewise be produced of electrically conductive material if the contacts 6, 7, 8, and 9 are arranged so as to be electrically insulated from the material of the valve casing 5. A movable switching element in the form of a piston 10 is made of electrically conductive material, so that, by appropriate positioning of the piston 10, either the contacts 6 and 7 or 8 and 9 are bridgeable. In this way a multiple position control of the switching element constructed as a piston 10 in this example embodiment, is attainable. In FIG. 1, the sleeve 1 forms a valve housing and the movable operating element 2 forms a valve plug. The electrical contact 3 forms a valve seat. The housing 1 has ports 29 above the valve seat 3 and a port 30 below the valve seat 3. The upper end of the housing 1 may be closed by a cover 11, which may be provided with an electrical contact 12 insulated from the cover head 13. In the shown closed position, the plug 2 of electrically conducting material closes an electrical circuit through the contacts 3 and 4 and through the plug 2. In the fully opened position of the plug 2 an electrical circuit is closed through the plug 2 and the contacts 4 and 12.

In FIG. 2, the valve sleeve 5 forms a housing with ports 14, 15, 16, 17, 18, and 19 and with cavities 26, 27, and 28 as is conventional. The piston 10 has three piston heads 20, 21, 22 arranged for cooperation with the respective one of said cavities 26, 27, and 28 to provide communication or close off communication between pairs of ports 14, 17; 15, 18; and 16, 19 when the piston 10 is moved back and forth as indicated by the arrow 24 by a conventional actuator not shown, but effective on a valve stem 25. The valve housing may be closed by covers 23 as is conventional. As in FIG. 1, the circuits in FIG. 2 will be closed directly through the valve piston 10 of electrically conducting material and pairs of the stationary contacts 6, 7, 8, and 9, depending on the relative position of the piston 10.

Although the invention has been described with reference to specific example embodiments, it is to be understood that it is intended to cover all modifications and equivalents within the scope of the appended claims.

What is claimed is:

1. A valve for controlling fluidic media, comprising valve housing means (1) of electrically conducting material and including a valve cavity and a plurality of fluid passage means in said valve housing means, stationary valve seat means located between said fluid passage means in said valve housing means and including first stationary electrical contact means and means on the inner surface of said cavity electrically insulating said first contact means from said valve housing means, electrically conducting valve plug means (2) axially movable in said valve cavity and having a given axial length, second stationary electrical contact means (4) forming part of said valve housing means and means on the inner surface of said cavity electrically insulating said second contact means from said valve housing means and located on an opposite side of said passage means and spaced from said first stationary electrical contact means at such a distance relative to said given axial length of said electrically conducting valve plug means that an electrical circuit is closed through said first and second electrical contact means directly through said electrically conducting valve plug means (2) when the electrically conducting valve plug means is in a valve closing position resting on said valve seat means, said electrical circuit being opened when said electrically conducting valve plug means moves off said valve seat means, whereby a wire connection to the valve plug means is avoided, and means insulating the valve housing means from said electrical circuit through said valve plug means wherein said valve cover means forms part of said valve housing means, third stationary electrical contact means (12) electrically insulated from said valve cover means and from said valve housing means, and being operatively supported relative to said second electrical contact means (4) in such a position that a further electrical circuit is closed through said stationary second and third electrical contact means and directly through said electrically conducting valve plug means (2) when the latter is in a valve opening position, said third stationary electrical contact means (12) supported in an insulating manner in said valve cover means, said valve cover means with said third staionary electrical contact means therein limiting the maximum open position of the valve plug means.

2. A spool valve for controlling fluidic media, comprising electrically insulated valve housing means (5) made of electrically non-conductive material, a longitudinal bore through said electrically insulated valve housing means, electrically conducting valve spool means operatively supported for axial movement in said longitudinal bore, said electrically conducting valve spool means comprising a plurality of spool pistons spaced along the valve spool means, said valve housing means comprising a corresponding plurality of fluid passage means positioned to be opened and closed by a respective one of said spool pistons, and stationary electric contact means (6, 7, 8, 9) electrically insulated from and positioned in said valve housing means on both sides of each of said respective fluid passage means, said electrically conducting valve spool means completing, depending on the instantaneous position of said electrically conducting valve spool means relative to the fluid passage means, different electrical circuits directly through a respective piston and a respective set of contact means, whereby a wire connection to the electrically conducting valve spool means is avoided, and whereby various circuits may be closed in various positions of the spool pistons relative to the fluid passages.

3. The spool valve of claim 2, wherein said fluid passage means comprise three equally spaced fluid passages, wherein said plug pistons comprise three plug pistons, and wherein said stationary electric contact means comprise four contact rings, pairs of said contact rings being disposed on respective sides of said fluid passages.

* * * * *

UNITED STATES PATENT AND TRADEMARK OFFICE
CERTIFICATE OF CORRECTION

PATENT NO. : 4,276,903
DATED : July 7, 1981
INVENTOR(S) : Hanswerner Spohr

It is certified that error appears in the above—identified patent and that said Letters Patent is hereby corrected as shown below:

--[30]         Foreign Application Priority Data

May 24, 1977 [DE] Fed. Rep. of Germany .......2723309
  June 28, 1977 [DE] Fed. Rep. of Germany .......2729063--.

Signed and Sealed this

Fourth Day of May 1982

[SEAL]

Attest:

GERALD J. MOSSINGHOFF

Attesting Officer    Commissioner of Patents and Trademarks